July 3, 1962            C. J. HUMPHREYS            3,042,829
SAPPHIRE SPECTRUM TUBE FOR MICROWAVE EXCITATION
Filed March 22, 1960
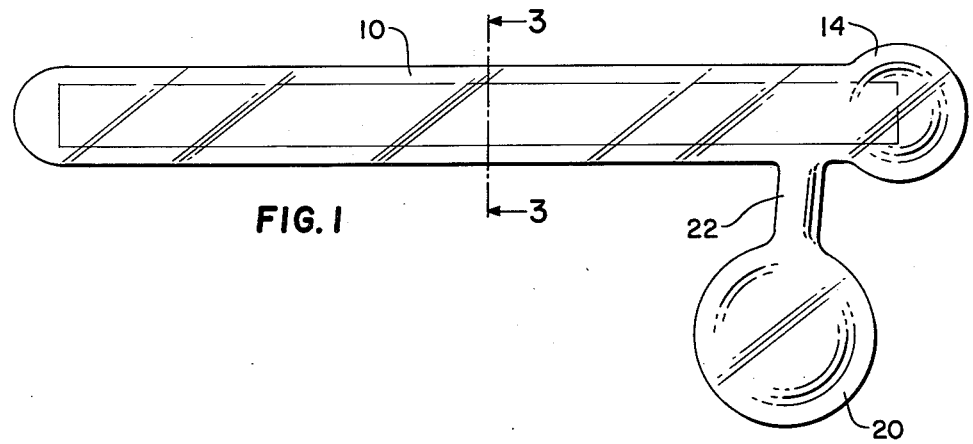
FIG. 1
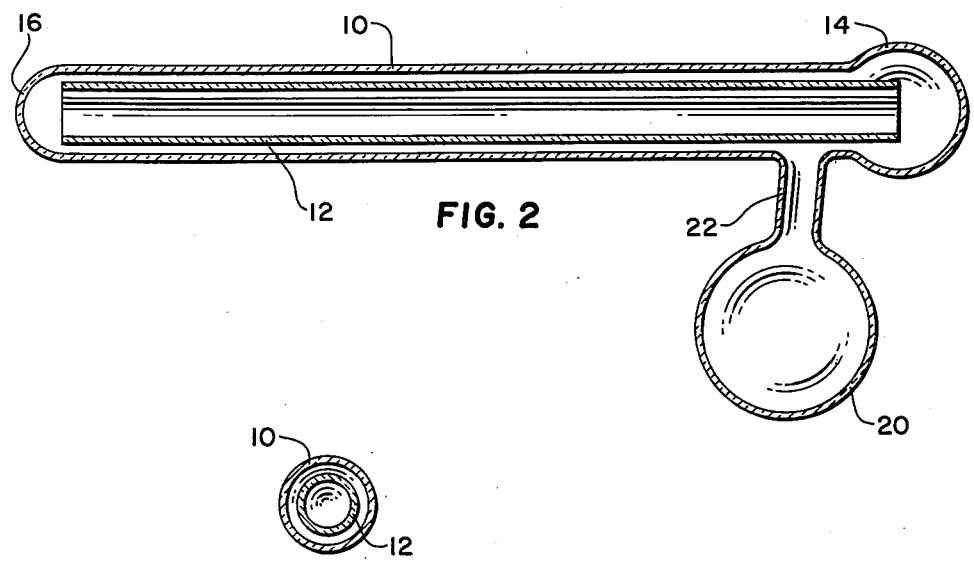
FIG. 2
FIG. 3
INVENTOR.
CURTIS J. HUMPHREYS
BY
*J. M. St. Amand*
ATTORNEYS

3,042,829
SAPPHIRE SPECTRUM TUBE FOR MICROWAVE EXCITATION
Curtis J. Humphreys, Riverside, Calif., assignor to the United States of America as represented by the Secretary of the Navy
Filed Mar. 22, 1960, Ser. No. 16,900
12 Claims. (Cl. 313—221)
(Granted under Title 35, U.S. Code (1952), sec. 266)

The invention herein described may be manufactured and used by or for the Government of the United States of America for governmental purposes without the payment of any royalties thereon or therefor.

The present invention relates to spectrum tubes and more particularly to a sapphire spectrum tube suitable for microwave excitation.

The spectrum tube of the present invention is particularly well suited as a spectroscopy source, and has uses for example, for: excitation of spectra of newly discovered elements or elements for which spectra are unexplored; controlled stages of excitation, particularly low or first stages; a source for excitation of infrequently occurring constituents in spectrochemical analysis, astrophysical problems, identification of elements in extraterrestrial sources by comparison with a laboratory source in the form of the present device; and, a source of standard wavelength for spectroscopy or metrology favored by principle of operation that leads to output of extremely homogeneous radiation desirable for use with various optical interferometers. In addition, the present device is very well suited for creating unique color effects in display lighting. This invention is also related to copending application for "Microwave-Excited Spectrum Tube With Internal Heater" by Edward Paul, Jr., Serial No. 16,898, filed March 22, 1960.

The prevailing design of tubes in current use incorporates a sealed straight section of glass or silicon tubing into which a suitable amount of a source element or compound of the element has been inserted and filled to an appropriate pressure with a carrier gas (usually one of the noble atmospheric gases). The tube is excited by radiation in the microwave field of a suitably designed antenna fed by a microwave generator. External heating is required for source elements of low vapor pressure.

The disadvantage of the old type spectrum tube is in the formation of compounds of the source element with the tube material. These compounds, presumably of silicon, are inert, glass-like, refractory substances. Once the element enters into such a compound, it is no longer excited so as to emit radiation, and the life of the tube is thus effectively shortened. This extreme degree of chemical activity makes the construction of enclosed spectroscopy sources utilizing alkalis, alkaline earths, earths, or rare earths extremely difficult.

The present invention overcomes the aforementioned disadvantages by using a section of sapphire tubing to contain the source material. An advantages of the present device is that chemically active elements may be excited to emit radiation in a source having a sufficiently long life that a prolonged period of observing may be attained. This is especially important where a method of radiometric scanning is employed. A necessary consequence of this prolonged life is that there is significant economy in the use of expensive, rare, or precious materials, since the expenditure incidental to the construction of numerous sources may be avoided.

It is an object of the invention therefore to provide a new and improved spectrum tube for a spectroscopic source.

It is also an object of the invention to provide a new spectrum tube for unique color effects in display lighting.

Another object of the invention is to provide a new and improved device as a source of standard wavelengths for metrology and spectroscopy.

A further object of the invention is to provide a new and improved microwave excited spectrum tube having controlled stages of excitation.

Other objects and many of the attendant advantages of this invention will become readily appreciated as the same becomes better understood by reference to the following detailed description when considered in connection with the accompanying drawings wherein:

FIGURE 1 is a side elevational view of a spectrum tube in accordance with this invention;

FIGURE 2 is a cross-sectional elevational view of the embodiment of the invention of FIGURE 1, and FIGURE 3 is a cross-sectional view of the embodiment of the invention of FIGURE 1, taken along line 3—3.

Referring now to the drawing, like numerals refer to like parts in each of the figures.

A preferred embodiment of the invention, for use as a spectrum tube for end-on viewing, employs a section of transparent tubing 10 made from glass, vycor, fuzed quartz or the like and houses a section of sapphire tubing 12 which is used to contain the source material. Outer tubing 10 is filled with an inert carrier gas and is of such size as to provide sufficient clearance between its inner surface and the outer surface of sapphire tubing 12 to avoid any binding over the range of operating temperatures. The diameter size of the sapphire tubing is selected to attain optimum operating conditions. For example, the outside diameter of sapphire tube 12 may be 9.5 mm. and the inside diameter be 6.5 mm.; however, these dimensions are not critical.

For end-on use outer-tubing 10 has a thin bulb 14 blown in one end thereof closing the end of the tube; the other end 16 of tube 10 is also sealed closed. Sapphire tube 12 is open at both ends and extends, within tube 10, from end 16 of the tube into bulb 14. A bulb 20 which forms a gas reservoir is attached to a side tube 22 which in turn is connected to the side of outer tube 10. Bulb 20 provides a reservoir of pressure so that the life of the device will be prolonged by minimizing the effect of losses of carrier gas by absorption or diffusion. Sapphire tube 12 is not individually sealed closed, but the interior of the quartz or glass tube envelope 10 is completely sealed off from the outside atmosphere. The source material contained within the sapphire tubing may be any material that has a melting and boiling point within the temperature range of the spectrum tube. For example, metals, metal chlorides, metal iodides, or the like may be used. Sapphire tube 12 may be closed at one end if desired however, the end of the sapphire tube 12 extending into bulb 14 should be open.

The spectrum tube is operated by being placed in suitable orientation to the antenna of a microwave generator, not shown, such that it is within the field of microwave energy. The microwave energy radiation will first excite the carrier gas and then as the spectrum tube becomes heated the source material will vaporize and show the spectrum. For elements of low vapor pressure heating may be required, in which case a tungsten wire heater described in the aforementioned copending application Serial No. 16,898 filed March 22, 1960, may be used with the present device. In such instance the wire heater would be inserted within the sapphire tube 12 and the device operated in substantially the same manner.

The present device avoids the necessity of vacuum seals to the sapphire tubing by telescoping the sapphire tubing inside a tube of glass or quartz.

Also, instead of placing the sapphire tube inside a glass or quartz envelope, the sapphire tube, itself, may form the main element of the device with seals to a suitable window at one end and a closure at the other by known methods of sealing sapphire to glass.

Obviously many modifications and variations of the present invention are possible in the light of the above teachings. It is therefore to be understood that within the scope of the appended claims the invention may be practiced otherwise than as specifically described.

What is claimed is:

1. A spectrum tube for microwave excitation comprising an outer transparent envelope of glass-like material having its interior completely sealed off from the outside atmosphere and filled with a carrier gas, a sapphire tube for containing a source material to be vaporized and then microwave excited housed within said transparent envelope, said sapphire tube being open at both ends thereof, whereby when the spectrum tube is placed within a suitable field of microwave energy radiation the carrier gas will first excite and then as the spectrum tube becomes heated the source material will vaporize and show its spectrum.

2. A spectrum tube for microwave excitation comprising an outer transparent envelope of glass-like material having its interior completely sealed off from the outside atmosphere and filled with an inert carrier gas, a sapphire tube containing a source material which is to be vaporized and then microwave excited housed within said transparent envelope, said sapphire tube being of such size as to substantially occupy the main interior of said transparent envelope and yet allow sufficient clearance between its exterior and the interior of the envelope to avoid any binding over a chosen range of operating temperatures, whereby when the spectrum tube is within a suitable field of microwave energy radiation the carrier gas will first excite and then as the spectrum tube becomes heated the source material within the sapphire tube will vaporize and show its spectrum.

3. A spectrum tube for microwave excitation comprising an outer transparent envelope of glass-like material having its interior completely sealed off from the outside atmosphere and filled with a carrier gas, a sapphire tube containing a source material to be vaporized and then microwave excited housed within said transparent envelope, whereby when the spectrum tube is placed within a suitable field of microwave energy radiation the carrier gas will first excite and then as the spectrum tube becomes heated the source material within the sapphire tube will vaporize and show its spectrum.

4. A device as in claim 3 wherein a bulb is provided at one end of said transparent envelope for end-on viewing.

5. A device as in claim 3 wherein said transparent envelope is made of glass.

6. A device as in claim 3 wherein said transparent envelope is made of quartz.

7. A device as in claim 3 wherein said transparent envelope is made of Vycor.

8. A device as in claim 3 wherein said sapphire tube is telescoped within said transparent envelope.

9. A spectrum tube for microwave energy excitation comprising an outer transparent envelope of glass-like material having its interior completely sealed off from the outside atmosphere and being filled with an inert carrier gas, a section of sapphire tubing containing a source material to be vaporized and then microwave excited housed within said transparent envelope, said transparent envelope having a carrier gas reservoir attached thereto to provide gas under pressure for minimizing the effect of losses of carrier gas by absorption and diffusion within said transparent envelope thus prolonging the life of the spectrum tube, whereby when the spectrum tube is placed within a suitable field of microwave energy radiation said carrier gas will first excite and then as the spectrum tube becomes heated said source material within said sapphire tubing will vaporize and show its spectrum.

10. A spectrum tube for microwave energy excitation comprising a section of sapphire tubing having sealed closures at each end and containing an inert carrier gas and a source material to be vaporized and then microwave excited, whereby when said tube is within a suitable field of microwave energy radiation the carrier gas will first excite and then as the tube becomes heated the source material will vaporize and show its spectrum.

11. A spectrum tube as in claim 10 wherein said sapphire tubing is provided with a window at one end thereof for end-on viewing.

12. A spectrum tube as in claim 10 wherein said sapphire tubing is provided wtih a sealed window for viewing the spectrum of the excited source material.

References Cited in the file of this patent

UNITED STATES PATENTS

| | | |
|---|---|---|
| 1,919,490 | Von Lepel | July 25, 1933 |
| 1,968,822 | Gaidies et al. | Aug. 7, 1934 |
| 2,118,452 | Le Bel | May 24, 1938 |
| 2,367,595 | Marden | Jan. 16, 1945 |
| 2,919,369 | Edgerton | Dec. 29, 1959 |